United States Patent
Kawachi

(10) Patent No.: US 11,542,387 B2
(45) Date of Patent: Jan. 3, 2023

(54) TIRE

(71) Applicant: SUMITOMO RUBBER INDUSTRIES, LTD., Kobe (JP)

(72) Inventor: Takahiro Kawachi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 205 days.

(21) Appl. No.: 16/868,969

(22) Filed: May 7, 2020

(65) Prior Publication Data

US 2020/0354549 A1   Nov. 12, 2020

(30) Foreign Application Priority Data

May 10, 2019  (JP) .............................. JP2019-090150
May 10, 2019  (JP) .............................. JP2019-090151
Mar. 6, 2020  (JP) .............................. JP2020-038867

(51) Int. Cl.
*C08L 9/06*  (2006.01)

(52) U.S. Cl.
CPC ........... *C08L 9/06* (2013.01); *C08L 2205/025* (2013.01); *C08L 2205/035* (2013.01)

(58) Field of Classification Search
CPC ................. C08L 9/06; C08L 2205/025; C08L 2205/035; C08L 23/14; C08L 9/00; C08L 7/00; B60C 1/0016; C08K 3/04; C08K 3/36

See application file for complete search history.

(56) References Cited

U.S. PATENT DOCUMENTS

2012/0214933 A1\*  8/2012  Lopez .................... C08L 25/08
                                                                 524/502
2018/0186973 A1\*  7/2018  Kitago .................... C08L 9/00

FOREIGN PATENT DOCUMENTS

EP         3 575 359 A1    12/2019
WO    WO 2018/139165 A1    8/2018

OTHER PUBLICATIONS

Flow Polymers (Flow Polymers: Promix 400 Homogenizing Agent Applications in Tires and Automotive Extrusion, 2011). (Year: 2011).\*

\* cited by examiner

*Primary Examiner* — Robert S Jones, Jr.
*Assistant Examiner* — Jiangtian Xu
(74) *Attorney, Agent, or Firm* — Birch, Stewart, Kolasch & Birch, LLP

(57) ABSTRACT

An object of the present invention is to provide a rubber composition for a tread which is good in the balance between its wet grip performance and its chipping resistance. The rubber composition for a tread comprises 1 to 20 parts by mass of an ethylene-propylene-styrene copolymer and 60 parts by mass or more of a filler comprising a silica based on 100 parts by mass of a rubber component comprising 20 to 50% by mass of a butadiene rubber and 30 to 80% by mass of a styrene butadiene rubber, wherein an elongation at break of the rubber composition is not less than 300% in the atmosphere of 180° C. according to JIS K 6251: 2017.

10 Claims, No Drawings

TIRE

TECHNICAL FIELD

The present invention relates to a rubber composition for a tread and a tire having a tread composed of the rubber composition.

BACKGROUND OF THE INVENTION

WO2018/139165 describes a tire having a tread composed of a rubber composition comprising an ethylene-propylene-styrene copolymer.

SUMMARY OF THE INVENTION

As in the rubber composition described in WO2018/139165, there is still a problem that when a blending amount of natural rubber in a rubber composition is increased for improving chipping resistance, the wet grip performance decreases.

An object of the present invention is to provide a rubber composition for a tread which is good in the balance between its wet grip performance and its chipping resistance.

The present invention has been achieved by the finding that when a rubber composition for a tread comprises a rubber component comprising prescribed amounts of butadiene rubber and styrene butadiene rubber, ethylene-propylene-styrene copolymer, and a filler comprising silica and has an elongation at break in a prescribed range, its wet grip performance and chipping resistance are improved in a balanced manner.

According to the present invention, a rubber composition for a tread which is good in the balance between its wet grip performance and its chipping resistance and a tire having a tread composed of the rubber composition can be provided.

DETAILED DESCRIPTION

The rubber composition for a tire of one embodiment of the present invention is characterized by comprising a rubber component comprising prescribed amounts of butadiene rubber and styrene butadiene rubber, an ethylene-propylene-styrene copolymer, and a filler comprising silica and having an elongation at break in a prescribed range. It should be noted that when "to" is used herein to indicate a numerical range, the range includes the values of the both ends.

The term "normal rim" used herein refers to a rim specified for each tire by a standard for tires in the standard system including the standard, for example, a standard rim for JATMA, "Design Rim" for TRA, and "Measuring Rim" for ETRTO.

The "normal internal pressure" herein is air pressure which the standard specifies for each tire, for example, the highest air pressure for JATMA, the maximum value found in the table "TIRE LOAD LIMITS AT VARIOUS COLD INFLATION PRESSURES" for TRA, "INFLATION PRESSURE" for ETRTO The present invention consists of the first to the third inventions, which will be described in the following.

The First Invention

The first invention relates to:

[1] A rubber composition for a tread comprising 1 to 20 parts by mass (preferably 2 to 15 parts by mass, more preferably 3 to 10 parts by mass) of an ethylene-propylene-styrene copolymer and not less than 60 parts by mass (preferably 60 to 150 parts by mass, more preferably 65 to 140 parts by mass) of a filler comprising a silica based on 100 parts by mass of a rubber component comprising 20 to 50% by mass (preferably 22 to 45% by mass, more preferably 25 to 40% by mass) of a butadiene rubber and 30 to 80% by mass of a styrene butadiene rubber (preferably 35 to 78% by mass, more preferably 40 to 75% by mass), wherein an elongation at break of the rubber composition is not less than 300% (preferably not less than 325%, more preferably not less than 350%) in the atmosphere of 180° C. according to JIS K 6251: 2017;

[2] The rubber composition for a tread of the above [1], wherein the ethylene-propylene-styrene copolymer has a composition ratio of 10 to 60% by mass of ethylene, 10 to 60% by mass of propylene, and 5 to 40% by mass of styrene;

[3] The rubber composition for a tread of the above [1] or [2], wherein the rubber component comprises 30 to 80% by mass (preferably 35 to 78% by mass, more preferably 40 to 75% by mass) of an emulsion polymerized styrene butadiene rubber;

[4] The rubber composition for a tread of any one of the above [1] to [3], comprising 1 to 120 parts by mass (preferably 5 to 105 parts by mass, more preferably 10 to 90 parts by mass) of a silica having a nitrogen adsorption specific surface area of not less than 150 $m^2/g$;

[5] The rubber composition for a tread of any one of the above [1] to [4], comprising 20 to 120 parts by mass (preferably 25 to 100 parts by mass, more preferably 30 to 80 parts by mass) of a carbon black having a nitrogen adsorption specific surface area of not less than 100 $m^2/g$; and

[6] A tire having a tread composed of the rubber composition for a tread of any one of the above [1] to [5].

<Rubber Component>

The rubber component used in the first invention comprises styrene butadiene rubber (SBR) and butadiene rubber (BR). Isoprene rubber such as natural rubber also may be blended to the extent that the effect of the present invention is not impaired. Also, the rubber component can be a rubber component consisting only of SBR and BR or can be a rubber component consisting only of isoprene rubber, SBR, and BR.

(SBR)

The SBR, which may be oil extended or non-oil extended, is not particularly limited, and examples thereof include a solution-polymerized SBR (S-SBR), an emulsion-polymerized SBR (E-SBR), a modified SBRs thereof (modified S-SBR, modified E-SBR). Examples of the modified SBRs include terminal-modified and/or main chain-modified SBR, and a modified SBR coupled with a tin or silicon compound (such as a condensate, one having a branch structure, etc.). Among these, E-SBR is preferred because it provides good chipping resistance.

Examples of S-SBRs usable in the first invention include S-SBRs manufactured by JSR Corporation, Sumitomo Chemical Company, Limited, Ube Industries, Ltd., Asahi Kasei Corporation, ZEON CORPORATION, etc.

A styrene content of the SBR is, in terms of grip performance and rubber strength, preferably not less than 5% by mass, more preferably not less than 10% by mass, further preferably not less than 20% by mass. Also, in terms of fuel efficiency, the styrene content of the SBR is preferably not more than 60% by mass, more preferably not more than 50% by mass, further preferably not more than 40% by mass. It should be noted that herein the styrene content of the SBR is calculated in accordance with $^1$H-NMR measurement.

A content of the SBR in the rubber component is, in terms of chipping resistance, not less than 30% by mass, preferably not less than 35% by mass, more preferably not less than 40% by mass. Also, the content of the SBR in the rubber component is, in terms of abrasion resistance, not more than 80% by mass, preferably not more than 78% by mass, more preferably not more than 75% by mass, further preferably not more than 70% by mass.

(BR)

BR is not particularly limited, and any of those which are common in a tire industry can be used, such as a BR having a content of cis-1,4 bond of less than 50% (low cis BR), a BR having a content of cis-1,4 bond of 90% or more (high cis BR), a rare-earth butadiene rubber (rare-earth BR) synthesized using a rare-earth element catalyst, a BR comprising syndiotactic polybutadiene crystals (SPB-containing BR), a modified BR (high cis modified BR, low cis modified BR) and the like. Among these BRs, a high cis BR is preferred because it provides good abrasion resistance.

Examples of high-cis BRs include BR1220 available from ZEON CORPORATION, BR130B, BR150B and BR150L available from Ube Industries, Ltd., BR730 available from JSR Corporation and the like. When the rubber component comprises high cis BR, its low temperature characteristics and abrasion resistance can be enhanced. Examples of rare-earth BRs include BUNA-CB25 available from Lanxess K.K. and the like.

A cis-1,4 bond content of (cis content) of the BR is, in terms of durability and abrasion resistance, preferably not less than 90% by mass, more preferably not less than 93% by mass, more preferably not less than 95% by mass. When the BR has a larger cis content, a polymer chain is arranged regularly, and the interaction between the polymers becomes stronger, which improves the rubber strength. Therefore, the chipping resistance of the rubber composition is expected to be improved.

A content of the BR in the rubber component is not less than 20% by mass, preferably not less than 22% by mass, more preferably not less than 25% by mass. When it is less than 20% by mass, the effect of the present invention tends to be insufficient. Also, the content of the BR is not more than 50% by mass, preferably not more than 45% by mass, more preferably not more than 40% by mass. When it is more than 50% by mass, there is a tendency that chipping resistance decreases and block breakage becomes liable to occur.

(Isoprene Rubber)

Isoprene rubber which is commonly employed in a tire industry, such as isoprene rubber (IR) and natural rubber can be used. The natural rubber includes a modified natural rubber such as an epoxidized natural rubber (ENR), a hydrogenated natural rubber (HNR), a deproteinized natural rubber (DPNR) or a high purity natural rubber (UPNR) and the like, as well as un-modified natural rubber (NR). These rubbers may be used alone or in combination with at least two thereof.

NR is not particularly limited, and any of those which are common in a tire industry, such as SIR20, RSS #3, TSR20, can be used.

When the rubber component comprises the isoprene rubber, the content thereof in the rubber component is, in terms of chipping resistance, preferably not less than 1% by mass, more preferably not less than 3% by mass, further preferably not less than 5% by mass. Also, in terms of wet grip performance, the content of the isoprene rubber is preferably not more than 20% by mass, more preferably not more than 15% by mass, further preferably not more than 10% by mass.

(Other Rubber Components)

As a rubber component according to the first invention, a rubber component other than the above-mentioned isoprene rubber, SBR, and BR may be contained. As the other rubber components, a crosslinkable rubber component which is commonly employed in a rubber industry can be used, and examples thereof include diene rubber such as a styrene-isoprene-butadiene copolymer (SIBR), a chloroprene rubber (CR) and an acrylonitrile-butadiene rubber (NBR), and butyl rubbers. These other rubber components may be used alone or in combination with at least two thereof.

<Ethylene-Propylene-Styrene Copolymer>

An ethylene-propylene-styrene copolymer is a copolymer of ethylene, propylene, and styrene, wherein the ethylene phase and the propylene phase are compatible with a rubber component and the styrene phase is compatible with a filler. In the rubber composition according to the first invention, when a rubber component comprising SBR and BR, the copolymer, and a filler comprising silica are used together, the interaction between the polymer and the filler is improved. Accordingly, the dispersibility of the filler in the rubber component is improved, and the filler disperses uniformly; therefore, wet grip performance and chipping resistance are expected to be improved in a well-balanced manner.

The ethylene content of the ethylene-propylene-styrene copolymer is, in terms of fuel efficiency, preferably not less than 10% by mass, more preferably not less than 20% by mass, further preferably not less than 30% by mass. Also, in terms of wet grip performance, it is preferably not more than 60% by mass, more preferably not more than 50% by mass, further preferably not more than 40% by mass.

The propylene content of the ethylene-propylene-styrene copolymer is, in terms of wet grip performance, preferably not less than 10% by mass, more preferably not less than 20% by mass, further preferably not less than 30% by mass. Also, in terms of fuel efficiency, it is preferably not more than 60% by mass, more preferably not more than 50% by mass, further preferably not more than 40% by mass.

The styrene content of the ethylene-propylene-styrene copolymer is, in terms of chipping resistance, preferably not less than 5% by mass, more preferably not less than 8% by mass, further preferably not less than 10% by mass. Also, in terms of the fuel efficiency, it is preferably not more than 40% by mass, more preferably not more than 25% by mass, further preferably not more than 20% by mass.

Examples of such ethylene-propylene-styrene copolymers include PROMIX400 available from Flow Polymers Inc.

A content of the ethylene-propylene-styrene copolymer based on 100 parts by mass of the rubber component is not less than 1 parts by mass, preferably not less than 2 parts by mass, more preferably not less than 3 parts by mass. When the content of the ethylene-propylene-styrene copolymer is less than 1 parts by mass, chipping resistance tends to be decreased. Also, the content of the ethylene-propylene-styrene copolymer is not more than 20 parts by mass, preferably not more than 15 parts by mass, more preferably not more than 10 parts by mass, further preferably not more than 5 parts by mass. When the content of the ethylene-propylene-styrene copolymer is more than 20 parts by mass, wet grip performance tends to be decreased.

<Filler>

The filler used in the first embodiment is characterized by comprising silica as an essential component. Silica is preferably used with a silane coupling agent.

(Silica)

Silica is not limited particularly, and any of those which are common in a tire industry, such as silica prepared by a dry method (anhydrous silica) and silica prepared by a wet method (hydrous silica), can be used. Among those, hydrous silica prepared by a wet method is preferred because it contains a lot of silanol groups. Those kinds of silica may be used alone or in combination with at least two thereof.

A nitrogen adsorption specific surface area ($N_2SA$) of the silica is, in terms of elongation at break, preferably not less than 125 $m^2/g$, more preferably not less than 150 $m^2/g$, further preferably not less than 175 $m^2/g$, particularly preferably not less than 200 $m^2/g$. Also, the $N_2SA$ of the silica is, in terms of fuel efficiency and processability, preferably not more than 350 $m^2/g$, more preferably not more than 300 $m^2/g$, further preferably not more than 250 $m^2/g$. When the above-mentioned small particle-sized silica is dispersed in the neighborhoods of boundaries of each phase of isoprene rubber, BR and SBR, the contact area of the rubber component and the silica increases; therefore, chipping resistance is expected to be improved. It should be noted that herein the $N_2SA$ of the silica is a value measured by the BET method in accordance with ASTM D3037-81.

A content of silica based on 100 parts by mass of the rubber component is, in terms of wet grip performance, preferably not less than 1 parts by mass, more preferably not less than 3 parts by mass, further preferably not less than 5 parts by mass, particularly preferably not less than 10 parts by mass. Also, in terms of dispersibility and processability of the silica, the content of silica is preferably not more than 120 parts by mass, more preferably not more than 105 parts by mass, further preferably not more than 90 parts by mass, particularly preferably not more than 80 parts by mass.

(Silane Coupling Agent)

Silica is preferably used in combination with a silane coupling agent. The silane coupling agent is not limited particularly, and any of those which are conventionally employed with silica in a rubber industry can be used. Examples of such silane coupling agents include: sulfide-based silane coupling agents such as bis(3-triethoxysilylpropyl) disulfide and bis(3-triethoxysilylpropyl) tetrasulfide; mercapto-based silane coupling agents such as 3-mercaptopropyltrimethoxysilane and NXT-Z100, NXT-Z45, NXT and the like manufactured and sold by Momentive Performance Materials; vinyl-based silane coupling agents such as vinyltriethoxysilane, vinyl trimethoxysilane; amino-based silane coupling agents such as 3-aminopropyltriethoxysilane, 3-aminopropyltrimethoxysilane, and 3-(2-aminoethyl) aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitroproropyltriethoxysilane; and chloro-based silane coupling agents such as 3-chloropropyltrimethoxysilane and 3-chloropropyltriethoxysilane. These silane coupling agent may be used alone or in combination with at least two thereof.

When the rubber composition comprises the silane coupling agent, the content thereof is preferably not less than 0.1 parts by mass, more preferably not less than 0.5 parts by mass, further preferably not less than 1 parts by mass based on 100 parts by mass of the rubber component. Also, the content of the silane coupling agent is preferably not more than 20 parts by mass, more preferably not more than 10 parts by mass, further preferably not more than 5 parts by mass based on 100 parts by mass of the rubber component.

(Other Fillers)

Fillers other than silica may be used as a filler. Such a filler is not limited particularly, and, for example, fillers commonly used in a rubber industry such as carbon black, aluminum hydroxide, alumina (aluminum oxide), calcium carbonate, talc, clay, can be used. These fillers can be used alone or in combination with at least two thereof. Specifically, a filler comprising silica and carbon black is preferable, and a filler consisting only of silica and carbon black is more preferable.

Carbon black which is commonly employed for rubber can be suitably used. Examples of carbon black include furnace black, acetylene black, thermal black, channel black, graphite, and specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991 and the like can be used suitably. These kinds of carbon black may be used alone or in combination with at least two thereof.

A nitrogen adsorption specific surface area ($N_2SA$) of the carbon black is preferably not less than 100 $m^2/g$, more preferably not less than 125 $m^2/g$, further preferably not less than 135 $m^2/g$, particularly preferably not less than 145 $m^2/g$. Although the upper limit of the $N_2SA$ of the carbon black is not specifically limited, the $N_2SA$ of the carbon black is, in terms of fuel efficiency, dispersibility and processability, preferably not more than 400 $m^2/g$, more preferably not more than 300 $m^2/g$, further preferably not more than 250 $m^2/g$, particularly preferably not more than 200 $m^2/g$. When the above-mentioned small particle-sized carbon black is dispersed in the neighborhoods of boundaries of each phase of isoprene rubber, BR and SBR, the contact area of the rubber component and the silica increases; therefore, chipping resistance is expected to be improved. It should be noted that, herein, the $N_2SA$ of the carbon black is a value measured according to JIS K 6217-2 "Carbon black for rubber industry—Fundamental characteristics—Part 2: Determination of specific surface area—Nitrogen adsorption methods—Single-point procedures".

An average primary particle size of the carbon black is, preferably not more than 30 nm, preferably not more than 25 nm, further preferably not more than 20 nm. Also, the average primary particle size of the carbon black is, in terms of processability, preferably not less than 1 nm, more preferably not less than 5 nm, further preferably not less than 10 nm. When the carbon black has a particle size within the above range, it becomes easier to maintain a good balance between wet grip performance and chipping resistance. It should be noted that herein the average primary particle size of the carbon black can be obtained by calculating the average of 400 or more primary particles observed with a transmission electron microscope in a field.

When the rubber composition comprises the carbon black, the content thereof based on 100 parts by mass of the rubber component is, in terms of the weather resistance and reinforcing performance, preferably not less than 20 parts by mass, more preferably not less than 25 parts by mass, further preferably not less than 30 parts by mass, particularly preferably not less than 35 parts by mass. Although the upper limit of the content of the carbon black is not specifically limited, the content of the carbon black is, in terms of the fuel efficiency and processability, 120 parts by mass, more preferably not more than 100 parts by mass, further preferably not more than 90 parts by mass, particularly preferably not more than 80 parts by mass.

A content of the whole filler based on 100 parts by mass of the rubber component is, in terms of the effectiveness of the present invention, not less than 60 parts by mass, preferably not less than 65 parts by mass, more preferably not less than more preferably not less than 70 parts by mass. Also, in terms of dispersibility and processability of the filler, the content of the whole filler is preferably not more than 150 parts by mass, more preferably not more than 140 parts by mass, further preferably not more than 130 parts by mass, particularly preferably not more than 120 parts by mass.

A content of silica in the filler is, in terms of wet grip performance, preferably not less than 1% by mass, more preferably not less than 5% by mass, further preferably not less than 10% by mass, particularly preferably not less than 12% by mass. Also, in terms of weather resistance and reinforcing performance, preferably not more than 95% by mass, more preferably not more than 90% by mass, further preferably not more than 85% by mass.

<Other Components>

The rubber composition according to the first invention can suitably comprise, in addition to the above-mentioned rubber component, ethylene-propylene-styrene copolymer, and filler, a compounding agent and an additive which are conventionally employed in a tire industry, such as oil, wax, an antioxidant, stearic acid, zinc oxide, a vulcanizing agent, a vulcanization accelerator.

When the rubber composition comprises an oil, a content thereof is, for securing good abrasion resistance, preferably not more than 100 parts by mass, more preferably not more than 80 parts by mass, further preferably not more than 60 parts by mass based on 100 parts by mass of the rubber component. Also, in terms of processability, the content of the oil is preferably not less than 1 parts by mass, more preferably not less than 3 parts by mass, further preferably not less than 5 parts by mass. It should be noted that herein the content of the oil includes the oil content of oil-extended rubber.

When the rubber composition comprises a wax, a content thereof is, in terms of weather resistance of the rubber, preferably not less than 0.5 parts by mass, more preferably not less than 1 parts by mass based on 100 parts by mass of the rubber component. Also, for preventing whitening of a tire due to blooming, the content of the wax is preferably not more than 10 parts by mass, more preferably not more than 5 parts by mass.

An antioxidant is not limited particularly, and any of those which are employed in a rubber industry, such as quinoline-based, quinone-based, phenol-based, and phenylenediamine-based antioxidants, can be used.

When the rubber composition comprises an antioxidant, a content thereof is, in terms of ozone crack resistance of the rubber composition, preferably not less than 0.5 parts by mass, more preferably not less than 1 parts by mass based on 100 parts by mass of the rubber component. Also, in terms of abrasion resistance and grip performance, the content of the antioxidant is preferably not more than 10 parts by mass, more preferably not more than 5 parts by mass.

When the rubber composition comprises a stearic acid, a content thereof is, in terms of processability, preferably not less than 0.2 parts by mass, more preferably not less than 1 parts by mass based on 100 parts by mass of the rubber component. Also, the content of the stearic acid is, in terms of vulcanization rate, preferably not more than 10 parts by mass, more preferably not more than 5 parts by mass.

When the rubber composition comprises a zinc oxide, a content thereof is, in terms of the processability, preferably not less than 0.5 parts by mass, more preferably not less than 1 parts by mass based on 100 parts by mass of the rubber component. Also, in terms of abrasion resistance, the content of the zinc oxide is preferably not more than 10 parts by mass, more preferably not more than 5 parts by mass.

As a vulcanizing agent, sulfur is suitably used. Sulfur such as powdered sulfur, oil-treated sulfur, precipitated sulfur, colloidal sulfur, insoluble sulfur, highly dispersible sulfur can be used.

When sulfur is contained as a vulcanizing agent, the content thereof is, for assuring a sufficient vulcanization reaction and obtaining good grip performance and abrasion resistance, preferably not less than 0.5 parts by mass, more preferably not less than 1.0 parts by mass based on 100 parts by mass of the rubber component. Also, in terms of prevention of degradation, the content of the sulfur is preferably not more than 3.0 parts by mass, more preferably not more than 2.5 parts by mass.

Examples of vulcanizing agents other than sulfur include a vulcanizing agent containing a sulfur atom such as TACKIROL V200 manufactured by Taoka Chemical Co., Ltd., DURALINK HTS (1,6-hexamethylene-sodium dithiosulfate dehydrate) manufactured by Flexsys, KA9188 (1,6-bis(N,N'-dibenzylthiocarbamoyldithio)hexane) manufactured by LANXESS K.K., and an organic peroxide such as a dicumyl peroxide.

Examples of vulcanization accelerators include sulfenamide-, thiazole-, thiuram-, thiourea-, guanidine-, dithiocarbamate-, aldehyde amine- or aldehyde ammonia-, imidazoline- and xanthate-based vulcanization accelerators. These vulcanization accelerators may be used alone or in combination with at least two or more thereof. Among these, sulfenamide-based vulcanization accelerators, thiazole-based vulcanization accelerators and guanidine-based vulcanization accelerators are preferable, and sulfenamide-based vulcanization accelerators are more preferable.

Examples of sulfenamide-based vulcanization accelerators include N-t-butyl-2-benzothiazolylsulfenamide (TBBS), N-cyclohexyl-2-benzothiazolylsulfenamide (CBS), N,N'-dicyclohexyl-2-benzothiazolylsulfenamide (DCBS). Among these, N-t-butyl-2-benzothiazolylsulfenamide (TBBS) and N-cyclohexyl-2-benzothiazolylsulfenamide (CBS) are preferred.

When the rubber composition comprises a vulcanization accelerator, a content thereof is, in terms of vulcanization acceleration, preferably not less than 0.1 parts by mass, more preferably not less than 0.5 parts by mass based on 100 parts by mass of the rubber component. Also, in terms of the processability, the content of the vulcanization accelerator is preferably not more than 5 parts by mass, more preferably not more than 3 parts by mass.

<Manufacturing Rubber Composition and Tire>

The rubber composition according to the first invention can be manufactured by a known method, for example, in which components other than a vulcanizing agent and a vulcanization accelerator are kneaded with a known kneading machine which is employed in a general rubber industry, such as, Banbury mixer, a kneader, or an open roll, then a vulcanizing agent and a vulcanization accelerator are added thereto, and vulcanizing the kneaded product.

The rubber composition according to the first invention is preferably used for a tread of a tire because it provides good chipping resistance.

An elongation at break (elongation at cut) EB (%) of the rubber composition according to the first invention is not less than 300%, preferably not less than 325%, more preferably not less than 350%. It should be noted that herein the elongation at break is measured by conducting a tensile test of a No. 3 dumbbell test piece made of the vulcanized rubber composition, in the atmosphere of 180° C. according to JIS K 6251: 2017 "Vulcanized Rubber and Thermoplastic Rubber-Method of Obtaining Tensile Characteristics".

A tire comprising the rubber composition according to the first invention can be manufactured by a conventional method with the above-mentioned rubber composition. Specifically, the above-mentioned rubber composition, in which the above-mentioned compounding agent is blended to the rubber components as needed, is extruded into a shape of, for example, a tread, laminated with other tire members on a tire molding machine, and then molded by a conventional method to form an unvulcanized tire. A tire can be manufactured by heating and pressurizing this unvulcanized tire in a vulcanizer.

The Second Invention

The second invention relates to:

[1] A rubber composition for a tread comprising 1 to 20 parts by mass of an ethylene-propylene-styrene copolymer and 60 parts by mass or more of a filler comprising a silica based on 100 parts by mass of a rubber component comprising 0 to 20% by mass of an isoprene rubber, 30 to 50% by mass of a butadiene rubber, and 30 to 70% by mass of a styrene butadiene rubber, wherein an elongation at break of the rubber composition is not less than 300% in the atmosphere of 180° C. according to JIS K 6251: 2017;

[2] The rubber composition for a tread of the above [1], wherein the ethylene-propylene-styrene copolymer has a composition ratio of 10 to 60% by mass of ethylene, 10 to 60% by mass of propylene, and 5 to 40% by mass of styrene;

[3] The rubber composition for a tread of the above [1] or [2], the rubber component comprises 30 to 70% by mass of an emulsion polymerized styrene butadiene rubber;

[4] The rubber composition for a tread of any one of the above [1] to [3], wherein a content of the silica in the filler is 1 to 70% by mass;

[5] The rubber composition for a tread of any one of the above [1] to [4], comprising 1 to 100 parts by mass of a silica having a nitrogen adsorption specific surface area of not less than 150 m²/g;

[6] The rubber composition for a tread of any one of the above [1] to [5], comprising 20 to 120 parts by mass of a carbon black having a nitrogen adsorption specific surface area of not less than 100 m²/g; and

[7] A tire having a tread composed of the rubber composition for a tread of any one of the above [1] to [6].

<Rubber Component>

The rubber component used in the second invention comprises styrene butadiene rubber (SBR) and butadiene rubber (BR). Isoprene rubber such as natural rubber and other rubber components also may be blended to the extent that the effect of the present invention is not impaired. As SBR, BR, isoprene rubber, and other rubber component, the same rubber component as in the first invention can be used suitably in the same aspect.

A content of SBR of the rubber component is, in terms of chipping resistance, not less than 30% by mass, preferably not less than 35% by mass, more preferably not less than 40% by mass. Also, in terms of abrasion resistance, it is not more than 70% by mass, preferably not more than 65% by mass, more preferably not more than 60% by mass.

A content of BR in the rubber component is not less than 30% by mass, preferably not less than 35% by mass, more preferably not less than 40% by mass. When it is less than 30% by mass, the effect of the present invention tends to be insufficient. Also, the content of the BR is not more than 50% by mass, preferably not more than 45% by mass, more preferably not more than 40% by mass. When it is more than 50% by mass, there is a tendency that chipping resistance decreases and block breakage becomes liable to occur.

When the rubber component comprises the isoprene rubber, the content thereof in the rubber component is, in terms of chipping resistance, preferably not less than 1% by mass, more preferably not less than 3% by mass, further preferably not less than 5% by mass. Also, the content of the isoprene rubber in the rubber component is not more than 20% by mass, preferably not more than 15% by mass, more preferably not more than 10% by mass. When the content of the isoprene rubber in the rubber component is more than 20% by mass, wet grip performance tends to be decreased.

<Ethylene-Propylene-Styrene Copolymer>

The rubber composition according to the second invention comprises an ethylene-propylene-styrene copolymer. As an ethylene-propylene-styrene copolymer, the same rubber composition as in the first invention can be used suitably in the same aspect.

<Filler>

The filler used in the second invention is characterized by comprising silica as an essential component. Also, it is preferable to use the silica with a silane coupling agent. Further, carbon black or other fillers may be used as a filler. As silica, a silane coupling agent, carbon black, and other fillers, the same rubber composition as in the first invention can be used suitably in the same aspect.

A content of silica is, in terms of wet grip performance, preferably not less than 1 parts by mass, more preferably not less than 3 parts by mass, further preferably not less than 5 parts by mass, particularly preferably not less than 10 parts by mass based on 100 parts by mass of the rubber component. Also, in terms of dispersibility and processability of the silica, the content of silica is preferably not more than 100 parts by mass, more preferably not more than 70 parts by mass, further preferably not more than 40 parts by mass.

When the rubber composition comprises a silane coupling agent, a content thereof is, preferably not less than 0.1 parts by mass, more preferably not less than 0.5 parts by mass, further preferably not less than 1 parts by mass based on 100 parts by mass of the rubber component. Also, the content of the silane coupling agent based on 100 parts by mass of the rubber component is, preferably not more than 20 parts by mass, more preferably not more than 10 parts by mass, further preferably not more than 5 parts by mass.

When the rubber composition comprises a carbon black, the content thereof is, in terms of weather resistance and reinforcing performance, preferably not less than 20 parts by mass, more preferably not less than 35 parts by mass, further preferably not less than 50 parts by mass, particularly preferably not less than 60 parts by mass based on 100 parts by mass of the rubber component. Although the upper limit of the content of the carbon black is not specifically limited, the content of the carbon black is, in terms of fuel efficiency and processability, preferably not more than 120 parts by mass, more preferably not more than 100 parts by mass, further preferably not more than 90 parts by mass.

A content of the whole filler based on 100 parts by mass of the rubber component is, in terms of the effectiveness of the present invention, not less than 60 parts by mass, preferably not less than 65 parts by mass, more preferably not less than 70 parts by mass. Also, in terms of dispersibility and processability of the filler, the content of the whole filler is preferably not more than 150 parts by mass, more preferably not more than 140 parts by mass, further preferably not more than 130 parts by mass, particularly preferably not more than 120 parts by mass.

A content of silica in the filler is, in terms of wet grip performance, preferably not less than 1% by mass, more preferably not less than 5% by mass, further preferably not less than 10% by mass, particularly preferably not less than 12% by mass. Also, in terms of weather resistance and reinforcing performance, the content of silica in the filler is preferably not more than 70% by mass, more preferably not more than 50% by mass, further preferably not more than 40% by mass, particularly preferably not more than 30% by mass.

<Other Components>

The rubber composition according to the second invention can suitably comprise, in addition to the above-mentioned rubber component, ethylene-propylene-styrene copolymer, and filler, a compounding agent and an additive conventionally employed in the tire industry, such as oil, wax, antioxidant, stearic acid, zinc oxide, vulcanizing agent, vulcanization accelerator, as needed. As the above-mentioned compounding agent and additive, the same rubber composition as in the first invention can be used suitably in the same aspect.

<Manufacturing Rubber Composition and Tire>

The rubber composition according to the second invention can be manufactured by a known method, for example, in which components other than a vulcanizing agent and a vulcanization accelerator are kneaded with a known kneading machine which is employed in a general rubber industry, such as, Banbury mixer, a kneader, or an open roll, then a vulcanizing agent and a vulcanization accelerator are added thereto, and vulcanizing the kneaded product.

The rubber composition according to the second invention is preferably used for a tread of a tire because it provides good chipping resistance.

An elongation at break (elongation at cut) EB (%) of the rubber composition according to the second invention is not less than 300%, preferably not less than 325%, more preferably not less than 350%. The elongation at break used herein is measured by conducting a tensile test of a No. 3 dumbbell test piece made of the vulcanized rubber composition, in the atmosphere of 180° C. according to JIS K 6251: 2017 "Vulcanized Rubber and Thermoplastic Rubber-Method of Obtaining Tensile Characteristics".

A tire comprising the rubber composition according to the second invention can be manufactured by a conventional method with the above-mentioned rubber composition. Specifically, the above-mentioned rubber composition, in which the above-mentioned compounding agent is blended to the rubber components as needed, is extruded into a shape of, for example, a tread, laminated with other tire members on a tire molding machine, and molded by a conventional method to form an unvulcanized tire. A tire can be manufactured by heating and pressurizing this unvulcanized tire in a vulcanizer.

Third Invention

The third invention relates to:

[1] A rubber composition for a tread comprising 1 to 20 parts by mass of an ethylene-propylene-styrene copolymer and not less than 60 parts by mass of a filler comprising a silica based on 100 parts by mass of a rubber component comprising 55 to 80% by mass of a styrene butadiene rubber and 20 to 45% by mass of a butadiene rubber, wherein an elongation at break of the rubber composition is not less than 300% in the atmosphere of 180° C. according to JIS K 6251: 2017;

[2] The rubber composition for a tread of the above [1], comprising 25 to 45 parts by mass of a carbon black;

[3] The rubber composition for a tread of the above [1] or [2], the ethylene-propylene-styrene copolymer has a composition ratio of 10 to 60% by mass of ethylene, 10 to 60% by mass of propylene, 5 to 40% by mass of styrene;

[4] The rubber composition for a tread of any one of the above [1] to [3], wherein the rubber component comprises 55 to 80% by mass of emulsion polymerized styrene butadiene rubber;

[5] The rubber composition for a tread of any one of the above [1] to [4], wherein a content of the silica in the filler is 30 to 95% by mass;

[6] The rubber composition for a tread of any one of the above [1] to [5], comprising 20 to 120 parts by mass of a silica having a nitrogen adsorption specific surface area of not less than 150 $m^2/g$;

[7] The rubber composition for a tread of any one of the above [1] to [6], comprising 25 to 45 parts by mass of a carbon black having a nitrogen adsorption specific surface area of not less than 100 $m^2/g$; and

[8] A tire having a tread composed of the rubber composition for a tread of any one of the above [1] to [7].

<Rubber Component>

The rubber component used in the third invention comprises styrene butadiene rubber (SBR) and butadiene rubber (BR). Isoprene rubber such as natural rubber and other rubber components also may be blended to the extent that the effect of the present invention is not impaired. As SBR, BR, isoprene rubber, and other rubber components, the same rubber component as in the first invention can be used suitably in the same aspect.

A content of SBR in the rubber component is, in terms of chipping resistance, not less than 55% by mass, preferably not less than 57% by mass, more preferably not less than 60% by mass. Also, in terms of abrasion resistance, it is not more than 80% by mass, preferably not more than 78% by mass, more preferably not more than 75% by mass.

A content of BR in the rubber component is not less than 20% by mass, preferably not less than 22% by mass, more preferably not less than 25% by mass. When it is less than 20% by mass, the effect of the present invention tends to be insufficient. Also, the content of the BR is not more than 45% by mass, preferably not more than 43% by mass, more preferably not more than 40% by mass. When it is more than 45% by mass, there is a tendency that chipping resistance decreases and block breakage becomes liable to occur.

<Ethylene-Propylene-Styrene Copolymer>

The rubber composition according to the third invention comprises an ethylene-propylene-styrene copolymer. As the ethylene-propylene-styrene copolymer, the same rubber composition as in the first invention can be used suitably in the same aspect.

<Filler>

The filler used in the third invention is characterized by comprising silica as an essential component. Also, it is preferable to use the silica with a silane coupling agent. Further, carbon black or other fillers may be used as a filler. As silica, a silane coupling agent, carbon black, and other fillers, the same rubber composition as in the first invention can be used suitably in the same aspect.

A content of silica based on 100 parts by mass of the rubber component is, in terms of wet grip performance, preferably not less than 20 parts by mass, more preferably not less than 30 parts by mass, further preferably not less than 40 parts by mass, particularly preferably not less than 50 parts by mass. Also, in terms of dispersibility and processability of the silica, the content of silica is preferably not more than 120 parts by mass, more preferably not more than 105 parts by mass, further preferably not more than 90 parts by mass, particularly preferably not more than 80 parts by mass.

When the rubber composition comprises a silane coupling agent, a content thereof is preferably not less than 0.1 parts by mass, more preferably not less than 0.5 parts by mass, further preferably not less than 1 parts by mass based on 100 parts by mass of the rubber component. Also, the content of the silane coupling agent based on 100 parts by mass of the rubber component is, preferably not more than 20 parts by mass, more preferably not more than 10 parts by mass, further preferably not more than 5 parts by mass.

When the rubber composition comprises a carbon black, a content thereof is, in terms of weather resistance and reinforcing performance, preferably not less than 25 parts by mass, more preferably not less than 28 parts by mass, further preferably not less than 30 parts by mass based on 100 parts by mass of the rubber component. Also, in terms of wet grip performance, the content of the carbon black is preferably not more than 45 parts by mass, more preferably not more than 42 parts by mass, further preferably not more than 40 parts by mass.

A content of the whole filler based on 100 parts by mass of the rubber component is, in terms of the effectiveness of the present invention, not less than 60 parts by mass, preferably not less than 65 parts by mass, more preferably not less than 70 parts by mass. Also, in terms of dispersibility and processability of the filler, A content of the whole filler is preferably not more than 150 parts by mass, more preferably not more than 140 parts by mass, further preferably not more than 130 parts by mass, particularly preferably not more than 120 parts by mass.

A content of silica in the filler is, in terms of wet grip performance, preferably not less than 30% by mass, more preferably not less than 40% by mass, further preferably not less than 50% by mass, particularly preferably not less than 55% by mass. Also, in terms of weather resistance and reinforcing performance, the content of silica in the filler is preferably not more than 95% by mass, more preferably not more than 90% by mass, further preferably not more than 85% by mass.

<Other Components>

The rubber composition according to the third invention can suitably comprise, in addition to the above-mentioned rubber component, ethylene-propylene-styrene copolymer, and filler, a compounding agent and an additive conventionally employed in the tire industry, such as oil, wax, antioxidant, stearic acid, zinc oxide, vulcanizing agent, vulcanization accelerator, as needed. As the above-mentioned compounding agent and additive, the same rubber composition as in the second invention can be used suitably in the same aspect.

<Manufacturing a Rubber Composition and a Tire>

The rubber composition according to the third invention can be manufactured by a known method, for example, in which components other than a vulcanizing agent and a vulcanization accelerator are kneaded with a known kneading machine which is employed in a general rubber industry, such as, Banbury mixer, a kneader, or an open roll, then a vulcanizing agent and a vulcanization accelerator are added thereto, and vulcanizing the kneaded product.

The rubber composition according to the third invention is preferably used for a tread of a tire because it provides good chipping resistance.

An elongation at break (elongation at cut) EB (%) of the rubber composition according to the third invention is not less than 300%, preferably not less than 325%, more preferably not less than 350%. It should be noted that herein the elongation at break is measured by conducting a tensile test of a No. 3 dumbbell test piece made of the vulcanized rubber composition, in the atmosphere of 180° C. according to JIS K 6251: 2017 "Vulcanized Rubber and Thermoplastic Rubber-Method of Obtaining Tensile Characteristics".

A tire comprising the rubber composition according to the third invention can be manufactured by a conventional method with the above-mentioned rubber composition. Specifically, the above-mentioned rubber composition, in which the above-mentioned compounding agent is blended to the rubber components as needed, is extruded into a shape of, for example, a tread, laminated with other tire members on a tire molding machine, and molded by a conventional method to form an unvulcanized tire. A tire can be manufactured by heating and pressurizing this unvulcanized tire in a vulcanizer.

EXAMPLE

The present invention will be described in detail with reference to Examples, which however shall not be construed as limiting the invention thereto.

The chemicals used in Examples and Comparative Examples will be described.

NR: TSR20

SBR 1: JSR 1502 (E-SBR, styrene content: 23.5% by mass) available from JSR Corporation SBR 2: JSR 0112 (E-SBR, styrene content: 37% by mass, comprising 34 parts by mass of oil content based on 100 parts by mass of rubber solid content) available from JSR Corporation BR: BR1220 (unmodified BR, cis content: 96% by mass) available from ZEON CORPORATION Carbon black 1: DIABLACK I (N220) ($N_2SA$: 114 $m^2/g$, average primary particle size: 22 nm) available from Mitsubishi Chemical Corporation Carbon black 2: SHOBLACK N134 ($N_2SA$: 148 $m^2/g$, average primary particle size: 18 nm) available from Cabot Japan K. K.

Silica 1: ULTRASIL VN3 ($N_2SA$: 175 $m^2/g$) available from Evonik Degussa

Silica 2: Zeosil Premium 200MP ($N_2SA$: 220 $m^2/g$) available from Solvay

Silane coupling agent1: Si69 (bis(3-triethoxysilylpropyl) tetrasulfide) available from Evonik Degussa Silane coupling agent2: NXT-Z45 (a mercapto-based silane coupling agent) available from Momentive Performance Materials Copolymer: PROMIX400 available from Flow Polymers Inc.
Oil: VivaTec 400 (a TDAE oil) available from H&R
Wax: Ozoace 355 available from NIPPON SEIRO CO., LTD.
Antioxidant: ANTIGENE 6C (N-(1,3-dimethylbutyl)-N'-phenyl-p-phenylenediamine) available from Sumitomo Chemical Company, Limited
Stearic acid: Tsubaki available from NOF Corporation
Zinc oxide: ZINC FLOWER No. 1 available from Mitsui Mining 85 Smelting Co., Ltd.
Sulfur: sulfur powder available from Karuizawa Sulfur Co., Ltd.
Vulcanization accelerator: NOCCELER CZ (N-cyclohexyl-2-benzothiazolylsulfenamide) available from OUCHI SHINKO CHEMICAL INDUSTRIAL CO., LTD.

Examples and Comparative Examples

According to the compounding formulations shown in Tables 1 to 4, using a 1.7 L sealed Banbury mixer, all of the chemicals except sulfur and a vulcanization accelerator were kneaded for five minutes until it reaches a discharge temperature of 170° C. to obtain a kneaded product. Then, the obtained kneaded product was kneaded again (remilled) at a discharge temperature of 150° C. for four minutes by the Banbury mixer. Then, sulfur and a vulcanization accelerator were added to the obtained kneaded product, and kneaded for 4 minutes until it reaches 105° C. using a biaxial open roll to obtain an unvulcanized rubber composition. The obtained unvulcanized rubber composition was press-vulcanized at 170° C. for 12 minutes to manufacture a test rubber composition.

Further, the obtained unvulcanized rubber composition was extruded and molded into the shape of a tire tread by an extruder equipped with a base having a predetermined shape, laminated with other tire members to form an unvulcanized tire, and then press-vulcanized to manufacture and prepare a test tire (12R22.5, a tire for a truck and a bus).

The obtained test rubber composition and test tires were subjected to the following evaluation. Evaluation results are shown in Table 1.

<Elongation at Break>

Elongation at break (elongation at cut) EB (%) is measured by conducting a tensile test of No. 3 dumbbell test pieces made of each of the vulcanized rubber compositions, in the atmosphere of 180° C. according to JIS K 6251: 2017 "Vulcanized Rubber and Thermoplastic Rubber-Method of Obtaining Tensile Characteristics". A larger elongation at break indicates a better chipping resistance of a rubber composition.

<Wet Grip Performance>

Each of the test tires were mounted onto all the wheels of a vehicle (a Japanese, FF type 2000cc car), and braking distances were calculated on a wet asphalt road from an initial speed of 100 km/h. The results are shown by an index, wherein the index values of the reference comparative examples (Comparative Example 1 in Table 1 and 2 and Comparative Example 8 in Table 3 and 4) were set to 100. A larger index value indicates a better wet grip performance. The index values were calculated by the following formula. It should be noted that the target performance value is 95 or higher, preferably 98 or higher, more preferably 101 or higher.

(Index value of wet grip performance)=(braking distance of reference comparative example)/(braking distance of blending example)×100

<Chipping Resistance>

After being mounted to normal rims and filled with air to the normal internal pressure, each of the test tires were installed to a vehicle, and the vehicle was driven on a rough road at a speed of 50 km/h for four hours. After driving, the circumferential lengths of all of the cracks occurred on the tire surface were measured and the longest circumferential lengths of each tire were obtained. The results are shown by index values, wherein the index values of the reference comparative examples (Comparative Example 1 in Table 1 and 2 and Comparative Example 8 in Table 3 and 4) were set to 100. A larger index value indicates a better chipping resistance. The index values were calculated by the following formula. It should be noted that the target performance value is 95 or higher, preferably 98 or higher, more preferably 101 or higher.

(Index value of chipping resistance)=(circumferential length of crack of reference comparative example)/(circumferential length of crack of blending example)×100

The target performance value of the total performance of the wet grip performance and chipping resistance (an average value of the wet grip performance index value and the chipping resistance index value) is 103 or higher, preferably 105 or higher, more preferably 107 or higher.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Compounding amount (part by mass) | | | | | | | | | | |
| NR | — | — | 10 | 10 | 20 | 20 | — | — | — | — |
| SBR 1 | 60 | 60 | 50 | 50 | 40 | 40 | 60 | 60 | 60 | 60 |
| BR | 40 | 40 | 40 | 40 | 40 | 40 | 40 | 40 | 40 | 40 |
| Carbon black 1 | 60 | 60 | 60 | 60 | — | — | 60 | 60 | — | 50 |
| Carbon black 2 | — | — | — | — | 80 | 80 | — | — | 60 | — |
| Silica 1 | 10 | 10 | 10 | 10 | — | — | 10 | — | 10 | 40 |
| Silica 2 | — | — | — | — | 10 | 10 | — | 10 | — | — |
| Copolymer | 3.0 | 5.0 | 3.0 | 5.0 | 3.0 | 3.0 | 10.0 | 5.0 | 5.0 | 10.0 |
| Oil | 5.0 | 5.0 | 5.0 | 5.0 | 15.0 | 20.0 | 5.0 | 5.0 | 5.0 | 5.0 |
| Silane coupling agent 1 | 1.0 | 1.0 | 1.0 | 1.0 | — | — | 1.0 | 1.0 | 1.0 | 1.0 |
| Silane coupling agent 2 | — | — | — | — | 1.0 | 1.0 | — | — | — | — |
| Wax | 2.0 | 2.0 | 2.0 | 2.0 | 2.0 | 2.0 | 2.0 | 2.0 | 2.0 | 2.0 |
| Antioxidant | 2.5 | 2.5 | 2.5 | 2.5 | 2.5 | 2.5 | 2.5 | 2.5 | 2.5 | 2.5 |
| Stearic acid | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 |

TABLE 1-continued

|  | Example | | | | | | | | | |
|---|---|---|---|---|---|---|---|---|---|---|
|  | 1 | 2 | 3 | 4 | 5 | 6 | 7 | 8 | 9 | 10 |
| Sulfur | 1.4 | 1.4 | 1.4 | 1.4 | 1.4 | 1.4 | 1.4 | 1.4 | 1.4 | 1.4 |
| Vulcanization accelerator | 2.0 | 2.0 | 2.0 | 2.0 | 2.0 | 2.0 | 2.0 | 2.0 | 2.0 | 2.0 |
| Evaluation | | | | | | | | | | |
| High temperature tensile EB (180° C.) (%) | 312 | 334 | 357 | 364 | 416 | 465 | 340 | 373 | 382 | 410 |
| Wet grip performance | 103 | 102 | 106 | 110 | 119 | 136 | 101 | 109 | 110 | 143 |
| Chipping resistance | 107 | 113 | 119 | 122 | 140 | 159 | 119 | 125 | 129 | 142 |

TABLE 2

|  | Comparative Example | | | | | | |
|---|---|---|---|---|---|---|---|
|  | 1 | 2 | 3 | 4 | 5 | 6 | 7 |
| Compounding amount (part by mass) | | | | | | | |
| NR | — | 10 | 20 | — | — | 30 | — |
| SBR 1 | 60 | 50 | 40 | 60 | 60 | 70 | 40 |
| BR | 40 | 40 | 40 | 40 | 40 | — | 60 |
| Carbon black 1 | 60 | 60 | 60 | 60 | 60 | 60 | 60 |
| Carbon black 2 | — | — | — | — | — | — | — |
| Silica 1 | 10 | 10 | 10 | 10 | — | 10 | 10 |
| Silica 2 | — | — | — | — | — | — | — |
| Copolymer | — | — | — | 30.0 | 3.0 | 3.0 | 3.0 |
| Oil | 5.0 | 5.0 | 5.0 | 5.0 | 5.0 | 5.0 | 5.0 |
| Silane coupling agent 1 | 1.0 | 1.0 | 1.0 | 1.0 | 1.0 | 1.0 | 1.0 |
| Silane coupling agent 2 | — | — | — | — | — | — | — |
| Wax | 2.0 | 2.0 | 2.0 | 2.0 | 2.0 | 2.0 | 2.0 |
| Antioxidant | 2.5 | 2.5 | 2.5 | 2.5 | 2.5 | 2.5 | 2.5 |
| Stearic acid | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 |
| Sulfur | 1.4 | 1.4 | 1.4 | 1.4 | 1.4 | 1.4 | 1.4 |
| Vulcanization accelerator | 2.0 | 2.0 | 2.0 | 2.0 | 2.0 | 2.0 | 2.0 |
| Evaluation | | | | | | | |
| High temperature tensile EB (180° C.) (%) | 297 | 324 | 339 | 442 | 308 | 253 | 309 |
| Wet grip performance | 100 | 89 | 79 | 90 | 98 | 121 | 95 |
| Chipping resistance | 100 | 109 | 114 | 142 | 105 | 75 | 105 |

TABLE 3

|  | Example | | | | | | | | | |
|---|---|---|---|---|---|---|---|---|---|---|
|  | 11 | 12 | 13 | 14 | 15 | 16 | 17 | 18 | 19 | 20 |
| Compounding amount (part by mass) | | | | | | | | | | |
| SBR 2 | 80.4 | 80.4 | 80.4 | 80.4 | 80.4 | 80.4 | 100 | 80.4 | 80.4 | 80.4 |
| (rubber solid content therein) | (60) | (60) | (60) | (60) | (60) | (60) | (75) | (60) | (60) | (60) |
| BR | 40 | 40 | 40 | 40 | 40 | 40 | 25 | 40 | 40 | 40 |
| Carbon black 1 | 40 | 40 | 30 | 30 | — | — | 40 | 40 | — | 40 |
| Carbon black 2 | — | — | — | — | 30 | 30 | — | — | 40 | — |
| Silica 1 | 55 | 55 | 65 | 65 | — | — | 55 | 55 | 55 | — |
| Silica 2 | — | — | — | — | 70 | 75 | — | — | — | 55 |
| Copolymer | 3.0 | 5.0 | 3.0 | 5.0 | 3.0 | 5.0 | 5.0 | 10.0 | 5.0 | 5.0 |
| Oil | 5.0 | 5.0 | 5.0 | 5.0 | 15.0 | 20.0 | 5.0 | 5.0 | 5.0 | 5.0 |
| Silane coupling agent 1 | 4.4 | 4.4 | 5.2 | 6.0 | — | — | 4.4 | 4.4 | 4.4 | — |

TABLE 3-continued

| | Example | | | | | | | | | |
|---|---|---|---|---|---|---|---|---|---|---|
| | 11 | 12 | 13 | 14 | 15 | 16 | 17 | 18 | 19 | 20 |
| Silane coupling agent 2 | — | — | — | — | 5.6 | 6.0 | — | — | — | 4.4 |
| Wax | 2.0 | 2.0 | 2.0 | 2.0 | 2.0 | 2.0 | 2.0 | 2.0 | 2.0 | 2.0 |
| Antioxidant | 2.5 | 2.5 | 2.5 | 2.5 | 2.5 | 2.5 | 2.5 | 2.5 | 2.5 | 2.5 |
| Stearic acid | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 |
| Sulfur | 1.4 | 1.4 | 1.4 | 1.4 | 1.4 | 1.4 | 1.4 | 1.4 | 1.4 | 1.4 |
| Vulcanization accelerator | 2.0 | 2.0 | 2.0 | 2.0 | 2.0 | 2.0 | 2.0 | 2.0 | 2.0 | 2.0 |
| Evaluation | | | | | | | | | | |
| High temperature tensile EB (180° C.) (%) | 432 | 465 | 489 | 500 | 556 | 609 | 470 | 499 | 511 | 524 |
| Wet grip performance | 103 | 102 | 106 | 110 | 119 | 136 | 101 | 99 | 103 | 112 |
| Chipping resistance | 107 | 113 | 118 | 122 | 134 | 146 | 119 | 126 | 129 | 126 |

TABLE 4

| | Comparative Example | | | | | | |
|---|---|---|---|---|---|---|---|
| | 8 | 9 | 10 | 11 | 12 | 13 | 14 |
| Compounding amount (part by mass) | | | | | | | |
| SBR 2 | 80.4 | 80.4 | 80.4 | 80.4 | 80.4 | 134 | 53.6 |
| (rubber solid content therein) | (60) | (60) | (60) | (60) | (60) | (100) | (40) |
| BR | 40 | 40 | 40 | 40 | 40 | — | 60 |
| Carbon black 1 | 40 | 55 | 70 | 40 | 70 | 40 | 40 |
| Carbon black 2 | — | — | — | — | — | — | — |
| Silica 1 | 55 | 40 | 25 | 55 | — | 55 | 55 |
| Silica 2 | — | — | — | — | — | — | — |
| Copolymer | — | — | — | 30.0 | 3.0 | 3.0 | 3.0 |
| Oil | 5.0 | 5.0 | 5.0 | 5.0 | 5.0 | 5.0 | 5.0 |
| Silane coupling agent 1 | 4.4 | 3.2 | 2.0 | 4.4 | — | 4.4 | 4.4 |
| Silane coupling agent 2 | — | — | — | — | — | — | — |
| Wax | 2.0 | 2.0 | 2.0 | 2.0 | 2.0 | 2.0 | 2.0 |
| Antioxidant | 2.5 | 2.5 | 2.5 | 2.5 | 2.5 | 2.5 | 2.5 |
| Stearic acid | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 |
| Sulfur | 1.4 | 1.4 | 1.4 | 1.4 | 1.4 | 1.4 | 1.4 |
| Vulcanization accelerator | 2.0 | 2.0 | 2.0 | 2.0 | 2.0 | 2.0 | 2.0 |
| Evaluation | | | | | | | |
| High temperature tensile EB (180° C.) (%) | 297 | 324 | 339 | 552 | 382 | 250 | 443 |
| Wet grip performance | 100 | 89 | 79 | 90 | 73 | 122 | 83 |
| Chipping resistance | 100 | 109 | 114 | 141 | 120 | 86 | 105 |

From the results of Table 1 to Table 4, it can be seen that the rubber compositions for a tread of the present invention comprising a rubber component which comprises prescribed amounts of butadiene rubber and styrene butadiene rubber, an ethylene-propylene-styrene copolymer, and a filler comprising silica and having an elongation at break in a prescribed range has improved wet grip performance and chipping resistance in a balanced manner.

What is claimed is:

1. A rubber composition for a tread comprising:
   1 to 10 parts by mass of an ethylene-propylene-styrene copolymer and
   60 parts by mass or more of a filler comprising a silica, both based on 100 parts by mass of a diene rubber component,
   wherein the rubber component comprises 20 to 50% by mass of a butadiene rubber and 30 to 80% by mass of a styrene butadiene rubber,
   wherein an elongation at break of the rubber composition is not less than 300% in the atmosphere of 180° C. according to JIS K 6251: 2017.

2. The rubber composition for a tread of claim 1, wherein the ethylene-propylene-styrene copolymer has a composition ratio of 10 to 60% by mass of ethylene, 10 to 60% by mass of propylene, and 5 to 40% by mass of styrene.

3. The rubber composition for a tread of claim 1, wherein the rubber component comprises 30 to 80% by mass of an emulsion polymerized styrene butadiene rubber.

4. The rubber composition for a tread of claim 1, comprising 1 to 120 parts by mass of a silica having a nitrogen adsorption specific surface area of not less than 150 $m^2/g$.

5. The rubber composition for a tread of claim 1, comprising 20 to 120 parts by mass of a carbon black having a nitrogen adsorption specific surface area of not less than 100 $m^2/g$.

6. A tire having a tread composed of the rubber composition for a tread of claim 1.

7. The rubber composition for a tread of claim 1, comprising 1 to 5 parts by mass of the ethylene-propylene-styrene copolymer.

8. The rubber composition for a tread of claim 1, wherein the rubber component comprises 25 to 50% by mass of a butadiene rubber and 30 to 70% by mass of a styrene butadiene rubber.

9. The rubber composition for a tread of claim 8, comprising 20 to 120 parts by mass of a carbon black having a nitrogen adsorption specific surface area of not less than 100 $m^2/g$.

10. The rubber composition for a tread of claim 8, comprising 1 to 5 parts by mass of the ethylene-propylene-styrene copolymer.

* * * * *